US007347966B2

(12) United States Patent
Watanabe

(10) Patent No.: US 7,347,966 B2
(45) Date of Patent: Mar. 25, 2008

(54) METHOD FOR MANUFACTURING CERAMIC HEATER

(75) Inventor: Shindou Watanabe, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 211 days.

(21) Appl. No.: 10/372,134

(22) Filed: Feb. 25, 2003

(65) Prior Publication Data

US 2003/0183990 A1 Oct. 2, 2003

(30) Foreign Application Priority Data

Feb. 27, 2002 (JP) ............................ 2002-051367

(51) Int. Cl.
*C04B 33/32* (2006.01)
*H05B 3/00* (2006.01)

(52) U.S. Cl. ...................... 264/668; 264/122; 264/125; 264/669

(58) Field of Classification Search ................ 264/109, 264/669, 682, 71, 87, 125, 82, 122, 241, 264/667, 668, 677, 681, 683; 219/260, 270, 219/544; 291/544
See application file for complete search history.

(56) References Cited

U.S. PATENT DOCUMENTS

| | | | | |
|---|---|---|---|---|
| 5,233,166 | A * | 8/1993 | Maeda et al. | 219/552 |
| 5,993,722 | A * | 11/1999 | Radmacher | 264/442 |
| 6,049,065 | A * | 4/2000 | Konishi | 219/270 |
| 6,084,212 | A * | 7/2000 | Leigh | 219/270 |
| 6,274,855 | B1 * | 8/2001 | Tatematsu et al. | 219/548 |
| 6,359,261 | B1 * | 3/2002 | Watanabe et al. | 219/270 |
| 6,599,457 | B2 * | 7/2003 | Watanabe et al. | 264/122 |

FOREIGN PATENT DOCUMENTS

| | | |
|---|---|---|
| JP | 8 12462 | 1/1996 |
| JP | 2001130967 A * | 5/2001 |

OTHER PUBLICATIONS

Perry's Chemical Engineer's Handbook, 7th Edition, 1997, Sections 12 and 14.*

* cited by examiner

*Primary Examiner*—Carlos Lopez
(74) *Attorney, Agent, or Firm*—Lowe Hauptman Ham & Berner, LLP

(57) ABSTRACT

A method for manufacturing a ceramic heater includes mixing a conductive ceramic powder, an insulating ceramic powder, a sintering aid powder, and a solvent so as to obtain a slurry, drying the slurry so as to obtain a heating-element material powder, forming a green resistance-heating element from the heating-element material powder, embedding the green resistance-heating element in a ceramic substrate, and firing a resultant assembly. Water is used as the solvent. Drying of the slurry is performed by use of a fluidized-bed drying apparatus, a rotary drying apparatus, or a vibratory drying apparatus and, the apparatus being employed in combination with a medium for pulverization.

16 Claims, 3 Drawing Sheets

METHOD FOR MANUFACTURING CERAMIC HEATER

BACKGROUND OF THE INVENTION

1. Field of the Invention

The present invention relates to a method for manufacturing a ceramic heater and more particularly to a method for manufacturing a glow plug employed for starting a diesel engine and a glow plug.

2. Description of the Related Art

Conventionally, a ceramic heater of the type used for a glow plug employed for starting a diesel engine is manufactured in the manner described below. FIG. 1 illustrates a process for producing a ceramic heater from a material powder. First, a conductive ceramic powder 3, an insulating ceramic powder 5, a sintering aid powder 7—all these powders being finely pulverized in advance—and a solvent 9 are mixed by use of an attritor, a stirring pot 16, or the like, thereby obtaining a slurry 10 (1-1). The slurry 10 is placed in shallow containers 12 or the like. The shallow containers 12 are arranged within a stationary drying apparatus 14, and hot gas HG is circulated within the stationary drying apparatus 14 (1-2). The solvent 9 is thus evaporated, thereby yielding dry cakes 18 (symbol OG denotes outflow gas). The dry cakes 18, together with a medium 22 (pebbles), are placed in a ball mill 20 and crushed (1-3), thereby yielding a heating-element material powder 24. The heating-element material powder 24 and a binder 26 are kneaded and formed into a green resistance-heating element 28 by an injection molding process (1-4). The green resistance-heating element 28 is accommodated within a green ceramic substrate 30. The resultant assembly is fired through a method such as HIP, thereby yielding a ceramic heater 1 (1-5 and 1-6). Other components such as a metallic shell 32 and a metallic terminal 34 are assembled into the ceramic heater 1, to thereby fabricate a ceramic glow plug 36 (1-7).

As mentioned above, conventionally, the slurry 10 to be dried by use of the stationary drying apparatus 14 contains as the solvent 9 an organic solvent such as an alcohol, hexane, or xylene.

Recently, the influence of chemical substances on the environment has been discussed extensively. Under such circumstances, a tendency to limit use of organic solvents has arisen. The ceramic heater manufacturing field is no exception to this. Development of a process for obtaining a heating-element material powder without use of an organic solvent is urgently demanded.

Generally, water is used as a solvent in preparing a slurry in which insulating ceramic powder serves as a sole powder ingredient. However, the present inventors have found a problem involved in the use of water as a solvent. Specifically, the present inventors prepared a slurry by use of water in place of an organic solvent and, from the slurry, manufactured ceramic heaters for use in a glow plug, through the aforementioned conventional method. The ceramic heaters were subjected to a repetitive-electricity-application durability test in which the heaters were repeatedly subjected to a cycle consisting of electricity-effected heating and standing to cool. A large number of the tested ceramic heaters were found to be of low durability; i.e., a disconnection fault occurred after a small number of test cycles. Such ceramic heaters cannot be used in a glow plug, which must endure tens of thousands of electricity application cycles.

SUMMARY OF THE INVENTION

Thus, an object of the present invention is to provide a ceramic heater of excellent repetitive-electricity-application durability.

To achieve the above object, the present invention provides a method for manufacturing a ceramic heater comprising mixing a conductive ceramic powder, an insulating ceramic powder, a sintering aid powder, and a solvent so as to obtain a slurry; drying the slurry to obtain a heating-element material powder; forming a resistance-heating element from the heating-element material powder; embedding the resistance-heating element in a ceramic substrate; and firing the resultant assembly.

The invention is further characterized in that the solvent predominantly contains water and the drying of the slurry is performed by use of an apparatus selected from among a fluidized-bed drying apparatus, a rotary drying apparatus, and a vibratory drying apparatus, the apparatus being employed in combination with a medium.

An organic solvent has been used, since the use of water raises a problem. Since the use of water as a solvent for preparing a slurry involves increased aggregation of powder, hard secondary particles as shown in FIG. 2 (2-3) are formed. Also, the difference in specific gravity between a conductive ceramic component and an insulating ceramic component tends to cause segregation (see 2-2). When a material powder 4 involving such aggregation and segregation is used for producing ceramic heaters, great variation in resistance among produced ceramic heaters, or abnormal heat generation (see 2-4) occurs due to a failure to attain uniform dispersion of components. As shown in FIG. 2 (2-1), a preferred heating-element material powder is such that secondary particles are not formed, and particles of a conductive ceramic 3 and particles of an insulating ceramic 5 are uniformly dispersed.

The above-described method of the present invention dries a slurry that uses water as a solvent, through a dynamic process such as a fluidized-bed process, a rotary process, or a vibratory process in which powder is maintained in a fluidized state at all times. Further, the method dries the slurry that is placed in a container together with a medium. The slurry, together with a medium, is maintained in a fluidized state and dispersed while adhering to the surfaces of the medium. Since the dispersed slurry efficiently comes into contact with the air, the slurry is dried in a short period of time as a result of water being evaporated. Solid matter remaining on the surfaces of the medium exfoliates from the surfaces as a result of mutual friction and collision of the medium means. Thus, solid matter dispersed in the slurry; i.e., conductive ceramic particles, insulating ceramic particles, and sintering aid particles, can be efficiently obtained in the form of primary particles. In contrast to the drying process which employs a stationary drying apparatus, these processes do not involve a step of pulverizing dry cakes, thereby providing good productivity.

The insulating ceramic powder may comprise $Si_3N_4$. The conductive ceramic powder may comprise a material selected from the group consisting of TiN, $MoSi_2$, $WSi_2$, and WC. The densities of these components are as follows: $Si_3N_4$=3.2; TiN=5.43; $MoSi_2$=6.24; $WSi_2$=9.86; and WC=15.8 (unit: $g/cm^3$). As is understood from these values, the density ratio between the conductive component and the insulating component assumes a large value of 1.7 to 4.9. Therefore, the stationary drying process is not suitable for drying a water-solvent slurry having increased tendency toward aggregation of powder, since the process encounters difficulty in mitigating segregation—induced by difference in specific gravity—for re-establishing uniform dispersion even though crushing follows drying. That is, such a water-solvent slurry must be dried while being fluidized at all times.

Notably, the phrase "predominantly contains water" means that a predominant amount of water in terms of % by mass is contained therein. That is, in some cases, a mixed solvent of water and a hydrophilic organic solvent such as an alcohol may be used. Needless to say, the powders and slurry contain unavoidable impurities; herein, only substantial components are referred to.

DETAILED DESCRIPTION OF THE PREFERRED EMBODIMENTS

Embodiments of the invention will next be described, by way of example only.

Figure 1:
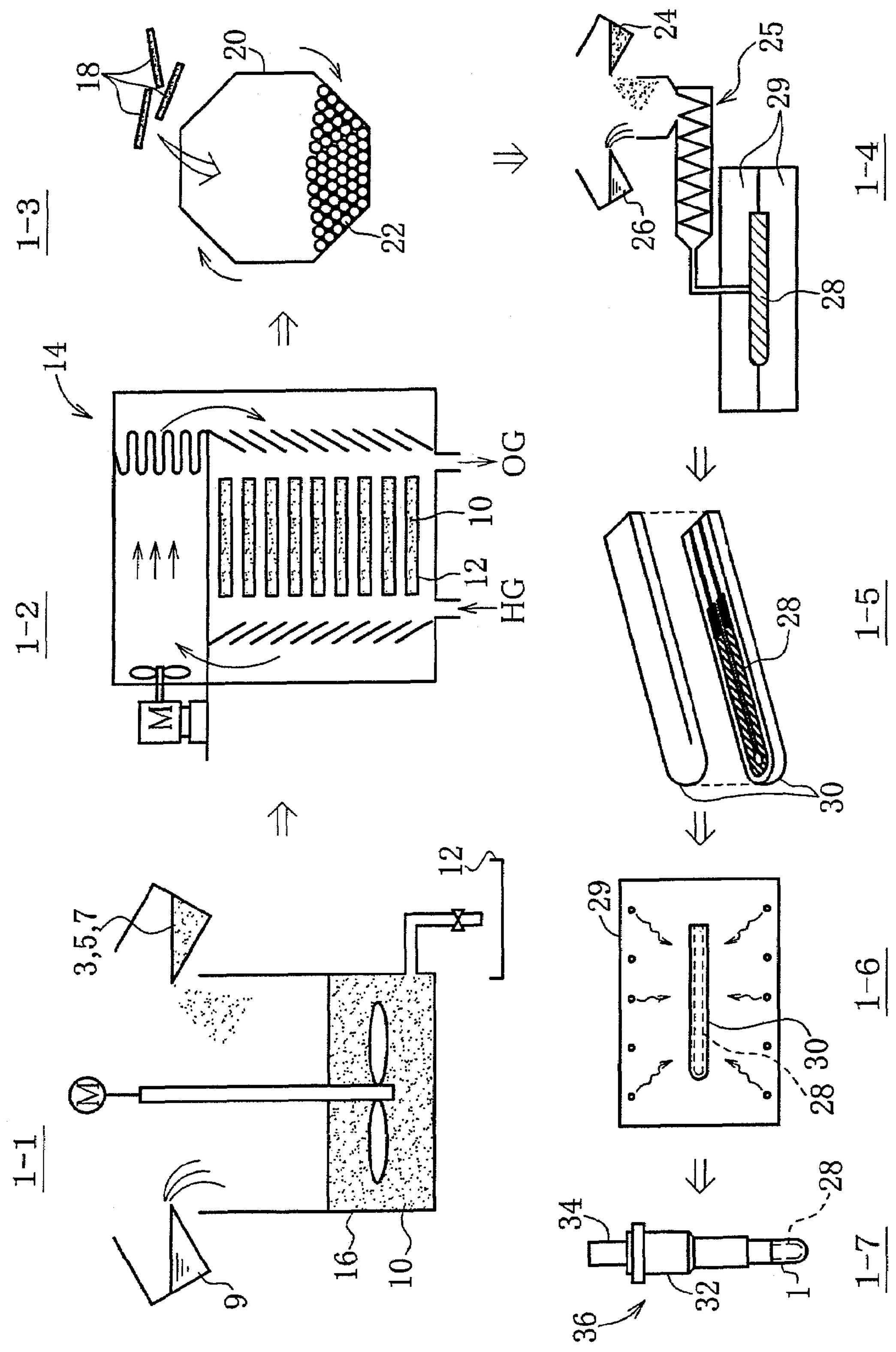
Fig. 1 PRIOR ART
FIG. 1 shows an explanatory view showing a process for obtaining a ceramic heater from a material powder.
Figure 2:
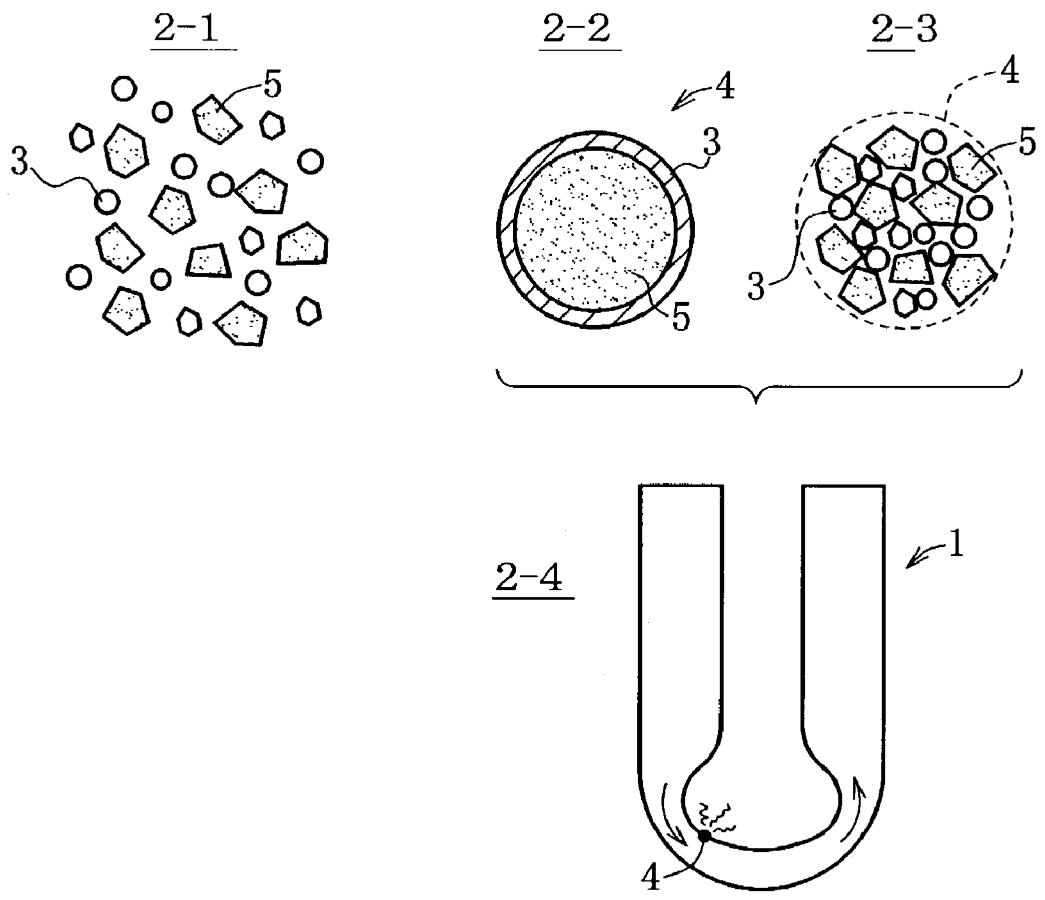
FIG. 2 shows views for explaining several forms to be assumed by heating-element material powder particles, and a problem arising in a ceramic heater stemming from a form of heating-element material powder particles.

The method for manufacturing a ceramic heater according to the invention is schematically shown in FIG. 1, except for the drying step. The steps of the method will next be specifically described with reference to FIG. 1.

Preparation

A slurry 10 is obtained by suspending a conductive ceramic powder 3, an insulating ceramic powder 5, and a sintering aid powder 7 in ion-exchange treated water 9. Preferably, the insulating ceramic powder is formed of $Si_3N_4$, and the conductive ceramic powder 3 comprises a material selected from the group consisting of TiN, $MoSi_2$, $WSi_2$, and WC. Preferably, the powders are individually purified and pulverized in advance. However, in preparation of the slurry 10, the powders may undergo micro-pulverization by use of a ball mill or an attritor. For example, when the conductive ceramic powder 3 of WC is to be used, the powder is preferably prepared such that the 50% particle size is about 1 μm as determined by use of a laser diffractometric particle-size analyzer. When the insulating ceramic powder 5 is formed of $Si_3N_4$, the powder preferably has a 50% particle size of about 1 μm.

In order to enhance properties at high temperature, preferably, a sintering aid comprises a predominant amount of a rare earth oxide, and an oxide of at least one element selected from the elements belonging to Groups 3A, 4A, 5A, 3B (e.g., Al), and 4B (e.g., Si) in the periodic table. The sintering aid is added in an amount of 3% to 15% by mass. When the sintering aid content is less than 3% by mass, a dense sintered body is difficult to obtain, whereas when the sintering aid content is in excess of 15% by mass, strength, toughness, or heat resistance may be insufficient. Thus, the sintering aid content is preferably 5% to 10% by mass. Also, the 50% particle size of the sintering aid powder 7 is preferably adjusted in advance to about 5 μm.

The conductive ceramic powder 3 (15 to 40 parts by mass), the insulating ceramic powder 5 (20 to 50 parts by mass), the sintering aid powder 7 (1 to 5 parts by mass), and the ion-exchange treated water 9 (25 to 50 parts by mass) are weighed and mixed by use of a stirring pot 16, thereby yielding the slurry 10. In the case in which a rotary drying apparatus or vibratory drying apparatus, which will be described later, is used for drying the slurry 10, the above-mentioned material powders and water can be charged directly into the drying apparatus. In the case where a fluidized-bed drying apparatus is used, the slurry 10 must be prepared separately, since the drying apparatus cannot prepare the slurry 10 directly from the powders and water. Notably, when conductive ceramic is used for forming a ceramic heater, a general deflocculant is preferably not used, for when Na or a similar component is migrated into a material powder, a low-melting-point glass phase is generated, thereby impairing high-temperature durability of a ceramic heater.

Drying

Figure 3:
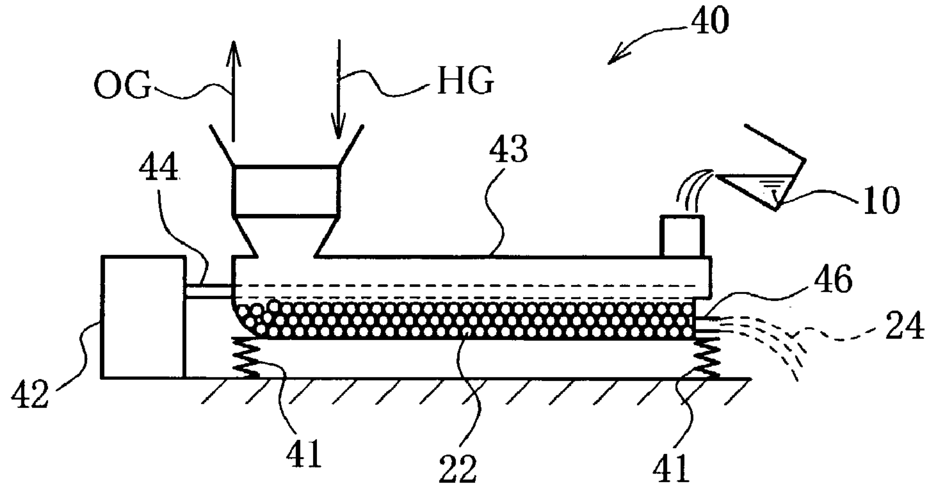
FIG. 3 is a schematic view showing a vibratory drying apparatus.

Several methods for drying the slurry 10 will now be described. First, FIG. 3 schematically shows a vibratory drying apparatus 40. The vibratory drying apparatus 40 is configured such that a hollow container 43 is supported by springs 41, and vibration generated by a vibrator 42 is transmitted to the container 43 via a rod 44 joined to the container 43. A medium 22 is placed in the container 43 in an amount of about 10% to about 80% the volume of the container 43. The slurry 10 prepared separately in advance is charged into the vibratory drying apparatus 40. Notably, this vibratory drying apparatus 40 and a rotary drying apparatus 70, which will be described later, allow the material powders 3, 5, and 7 and water 9 to be charged directly therein. In other words, the powders are suspended in a sufficiently mixed condition through application of vibration or rotation, and drying can be started without stopping the apparatus. This method can eliminate labor associated with preparation and transport of the slurry 10 and thus can be expected to enhance productivity. However, through this method, continuous drying of the slurry 10 without interruption is difficult to attain.

Hot gas HG is introduced into the container 43 so as to be brought into contact with the sufficiently suspended slurry 10. The slurry 10 is dispersed sufficiently by means of the violently vibrating medium 22 and assumes the form of a thin film on surfaces of the medium means 22 while water rapidly evaporates. Water contained in the slurry 10 flies off with outflow gas OG. An impacting action associated with mutual collision of the medium means suppresses the generation of secondary particles, thereby yielding a heating-element material powder 24 in the form of sufficiently mixed primary particles of the material powders. The container 43 may assume a dual structure such that an inner container can be closed and heated indirectly by means of a heating medium flowing through a space between the inner container and an outer container, thereby enabling heating under reduced pressure. After drying is completed, the heating-element material powder 24 is collected from an outlet 46. The present embodiment employs a batch-processing apparatus. However, a continuous-processing apparatus to which the slurry 10 is continually fed can be employed instead. This also applies to the methods to be described below.

The temperature of hot gas HG is set so as to fall within such an appropriate range of, for example 100° C.-200° C., that the slurry 10 is sufficiently dried and that the obtained material powder is free from any problem such as thermal degradation. When the slurry 10 contains, as a solvent, water alone or a predominant amount of water, a hot gas temperature lower than 100° C. is insufficient for drying the slurry 10; as a result, the obtained heating-element material powder 24 has an excessively high water content and thus tends to suffer aggregation. This temperature condition for hot gas HG is also applied to other drying methods to be described later. Notably, in place of feed of hot gas HG, the container of the slurry 10 may be heated by use of an infrared heater or the like.

The medium 22 substantially contributes to dispersion and drying of the slurry 10 and pulverization of powder, and assumes the form of balls of ceramic such as alumina, silicon nitride, or zirconia, or steel balls coated with urethane resin or epoxy resin. Since a typical drying apparatus uses a container body of stainless steel, use of resin-coated steel balls is preferred so as to reduce, to the greatest possible extent, migration of metallic impurities into a material powder. Incorporation of resin into the material powder is unlikely to raise problem, since the resin is eliminated during firing. The medium 22 is not necessarily in the form of balls and may assume, as appropriate, the form of a cube, a tubular form, or a plate-like form. Preferably, the medium 22 for use in the vibratory drying apparatus 40 or the rotary drying apparatus 70, which will be described later, comprises resin-coated steel balls having a diameter of, for example, about 25 mm. The container of the drying apparatus is more preferably lined with urethane resin or the like.

Figure 4:
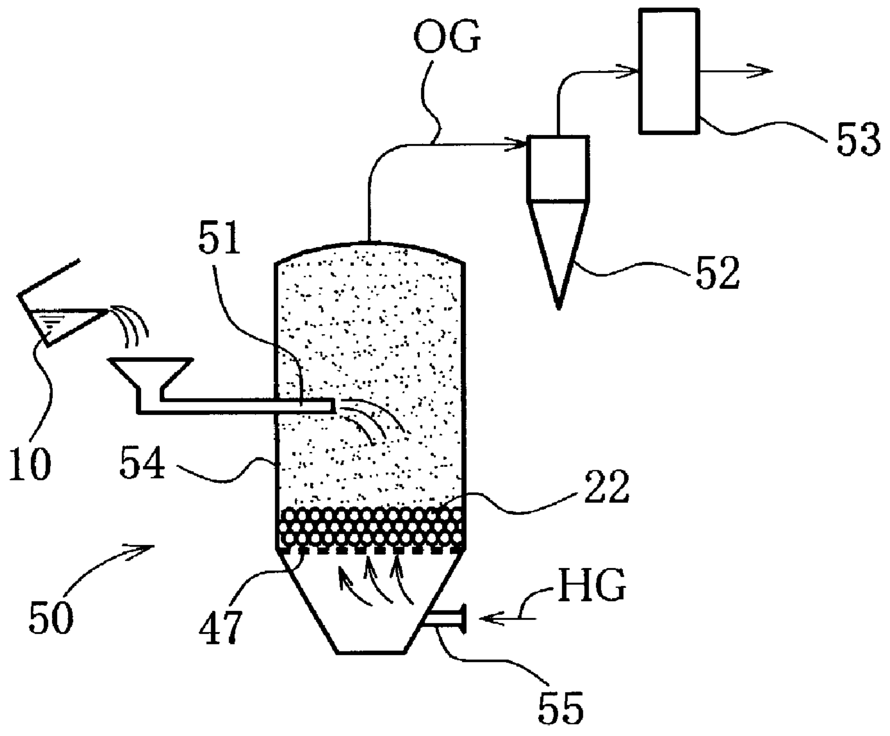
FIG. 4 is a schematic view showing a fluidized-bed drying apparatus.

Next, FIG. 4 schematically shows a fluidized-bed drying apparatus 50. The apparatus 50 includes a vertically arranged tubular container 54. A hot gas HG inlet 55 is provided at a lower portion of the container 54. A medium holder 47 is provided within the container 54. The medium holder 47 is formed of a gas-passing element such as mesh or a plate having through-holes formed therein, and adapted to permit passage of hot gas HG, but not to permit passage of the medium 22. The medium 22 is placed in layers on the medium holder 47. Hot gas HG flows upward from underneath the medium holder 47 through the container 54 while agitating the medium 22. The slurry 10 is fed through a nozzle 51 in such a manner as to fall to the medium 22 from above. The slurry 10 is dried by means of hot gas HG, and a material powder adheres to the surfaces of the medium 22. The flow of hot gas HG causes repeated agitation and fall of the medium 22. Thus, the medium means 22 collide and rub against one another, thereby suppressing aggregation of powder particles. Material powder particles not greater than a predetermined particle size fly off with hot gas HG and are collected by means of a cyclone 52 and a bag filter 53.

Importantly, the medium 22 for use in the fluidized-bed drying apparatus 50 is adjusted to such weight and size as to be sufficiently agitated when hot gas HG flows therethrough and to be able to impart sufficiently large impact to material powder particles. Further, preferably, the medium means are substantially uniform in size so as to leave an appropriate space thereamong, whereby the motion of the medium means is accelerated during flow of hot gas.

Figure 5:
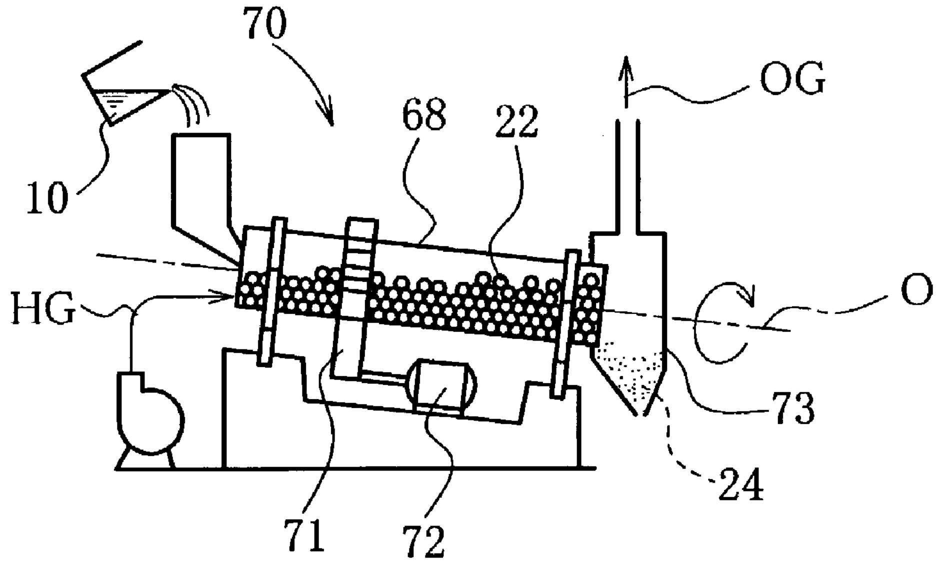
FIG. 5 is a schematic view showing a rotary drying apparatus.

Next, FIG. 5 schematically shows the rotary drying apparatus 70. The rotary drying apparatus 70 includes an elongated tubular container 68 supported in such a manner as to have a rotation axis O inclined slightly with respect to the horizontal. The container 68 is rotationally driven by means of a motor 72 via a gear ring 71. Hot gas HG flows into the container 68 from one end with respect to the direction of the rotation axis O. The slurry 10 is charged into the container 68 from above the one end of the container 68. The rotary drying apparatus 70 employs a parallel flow system; i.e., the inlet of the slurry 10 and the inlet of hot gas HG are located on the same side, so that the slurry 10 and hot gas HG move in the same direction. However, the rotary drying apparatus 70 may employ a counter flow system; i.e., the slurry 10 and hot gas HG move in opposite directions. The slurry 10 moves downstream through the container 68 while being dispersed to the medium 22 which is being agitated through rotary motion of the container 68, whereby evaporation of water is accelerated. The heating-element material powder 24 generated as a result of the slurry 10 being dried is collected in a collector 73 located at the downstream end of the container 68. The heating-element material powder contained in outflow gas OG is completely collected by means of a cyclone and/or bag filter.

As described above, the heating-element material powder 24 is obtained by means of drying the slurry 10 by use of any drying apparatus described above. As shown in FIG. 1, the thus-obtained heating-element material powder 24 and a binder 26 are kneaded, and the resultant mixture is injected into a mold 29 by means of an injection molding unit 25 (1-4). The present method does not require a pulverization step, which is involved in the stationary drying method. A green resistance-heating element 28 is removed from the mold 29 and embedded in a separately prepared green ceramic substrate 30. The present embodiment employs silicon nitride ceramic as insulating ceramic used to form the ceramic substrate 30. Silicon nitride ceramic assumes a micro-structure such that main-phase grains predominantly formed of silicon nitride ($Si_3N_4$) are bonded via a grain boundary phase derived from the previously mentioned sintering aid component or the like. The main phase may be such that a portion of Si or N atoms are substituted by Al or O atoms, and may contain metallic atoms such as Y in the form of solid solution. Silicon nitride ceramic may contain the previously mentioned sintering aid component in an amount similar to that mentioned previously. The assembly of the resistance-heating element 28 and the ceramic substrate 30 is fired through a method such as HIP, thereby yielding a ceramic heater 1.

EXPERIMENT EXAMPLES

Experiment Example 1

In order to confirm the effect of the present invention, the following experiments were conducted. First, a WC powder (5 vol.%; average particle size: 1 μm), an $Si_3N_4$ powder (19 vol.%; average particle size: 1 μm), an $Er_2O_3$ powder (0.8 vol.%; average particle size: 5 μm), an $SiO_2$ powder (0.2 vol.%; average particle size: 5 μm), and ion-exchange treated water (75 vol.%) were placed in a stirring pot 16 and stirred for suspension, thereby yielding a slurry 10. This slurry 10 was dried by the following two methods so as to obtain heating-element material powders 24: (1) stationary drying+dry crushing (ball mill); and (2) vibratory drying (medium employed). Each of the heating-element material powders 24 obtained by drying methods (1) and (2) was mixed with a binder. Each of the resultant mixtures was injection-molded into green resistance-heating elements 28. The green resistance-heating elements 28 were embedded in corresponding silicon nitride ceramic substrates 30. The resultant assemblies were fired, thereby yielding ceramic heaters 1.

The thus-obtained ceramic heaters 1 were tested for repetitive-electricity-application durability. Specifically, a predetermined voltage was applied to each of the ceramic heaters 1 for one minute, and then the ceramic heater 1 was allowed to cool at room temperature for 30 seconds, which was taken as one cycle. The cycle was repeated until a disconnection fault occurred. The number of cycles as counted until occurrence of a disconnection fault was recorded as a durable limit. Voltage to be applied was set such that heater temperature reached 1,300° C., 1,350° C., 1,400° C., or 1,450° C. at the first cycle. The repetitive-electricity-application durability test was carried out on five samples for each of the temperatures. The test results are shown in Tables 1 and 2. Table 1 (Comparative Example) shows the test results of drying method (1), and Table 2 (Example) shows the test results of drying method (2).

TABLE 1

| Temperature (° C.) | 1300 | 1350 | 1400 | 1450 |
|---|---|---|---|---|
| | 85296 | 24513 | 4210 | 84 |
| | 72100 | 15403 | 6598 | 120 |
| | 100000 | 9871 | 3947 | 251 |
| | 69987 | 21971 | 3681 | 421 |
| | 66142 | 18713 | 5228 | 214 |
| Average (cycles) | 78705 | 18094 | 4733 | 218 |

TABLE 2

| Temperature (° C.) | 1300 | 1350 | 1400 | 1450 |
|---|---|---|---|---|
| | 100000 | 100000 | 51093 | 387 |
| | 100000 | 91450 | 30650 | 274 |
| | 100000 | 100000 | 37678 | 547 |
| | 100000 | 100000 | 38754 | 421 |
| | 100000 | 100000 | 49826 | 394 |
| Average (cycles) | 100000 | 98290 | 41600 | 405 |

Referring to the test in which heating temperature was set to 1,400° C., the average number of durable cycles of five samples was 4,733 and 41,600 in stationary drying (Table 1) and medium-utilized vibratory drying (Table 2), respectively. This indicates that, even when material and the manufacturing procedure excluding drying are the same, different drying methods lead to significantly different performances. Conceivably, in stationary drying, segregation of components occurred in the process of drying the slurry 10, whereby a formed ceramic heater assumed a non-uniform microstructure; consequently, the ceramic heater raised abnormal heating, which could lead to disconnection fault. By contrast, the method of Example did not raise such a problem and could manufacture the ceramic heater 1 having sufficient repetitive-electricity-application durability. Therefore, in manufacture of the ceramic heater 1, when the slurry 10 uses water as a solvent, the slurry 10 should be carefully dried while being fluidized as for example by one of the methods described herein.

Experiment Example 2

Next, by use of conductive ceramic powders of TiN, $MoSi_2$, $WSi_2$, and WC, the ceramic heaters 1 were manufactured according to the same methods as those of Example 1. The 3-point bending test was carried out on samples classified according to employed conductive components and drying methods. In the 3-point bending test, flexural strength was measured at a regular-diameter portion adjacent to a rounded portion of a frontal end of the ceramic heater 1 under the following conditions: span 12 mm; and cross head speed 0.5 mm/sec. The regular-diameter portion of the ceramic heater has a diameter of 3.5 mm. The test results are shown in Tables 3 and 4. Table 3 (Comparative Example) shows the test results of drying method (1), and Table 4 (Example) shows the test results of drying method (2).

TABLE 3

| | TiN | $MoSi_2$ | $WSi_2$ | WC |
|---|---|---|---|---|
| | 1152 | 1326 | 1045 | 667 |
| | 1222 | 1264 | 782 | 1087 |
| | 1315 | 889 | 957 | 941 |
| | 1088 | 1273 | 1069 | 889 |
| | 1297 | 1199 | 1187 | 1178 |
| | 1291 | 1144 | 1244 | 909 |
| | 1173 | 1304 | 882 | 1143 |
| | 1385 | 1057 | 1294 | 768 |
| | 1053 | 1100 | 1144 | 1188 |
| | 1331 | 1255 | 1029 | 1120 |
| | 1287 | 1163 | 732 | 956 |
| | 1190 | 1021 | 990 | 821 |
| | 1077 | 997 | 1209 | 1088 |
| | 1322 | 1105 | 1100 | 1045 |
| | 1244 | 1223 | 1033 | 921 |
| | 1106 | 923 | 1033 | 730 |
| | 1170 | 1058 | 932 | 898 |
| | 1299 | 1031 | 866 | 1055 |
| | 1078 | 981 | 1021 | 1029 |
| | 1229 | 933 | 1121 | 974 |
| Average (MPa) | 1215 | 1112 | 1034 | 970 |

TABLE 4

| | TiN | $MoSi_2$ | $WSi_2$ | WC |
|---|---|---|---|---|
| | 1442 | 1420 | 1358 | 1181 |
| | 1357 | 1389 | 1432 | 1345 |
| | 1339 | 1408 | 1339 | 1277 |
| | 1412 | 1298 | 1420 | 1302 |
| | 1433 | 1310 | 1287 | 1149 |
| | 1279 | 1387 | 1266 | 1409 |
| | 1395 | 1423 | 1309 | 1246 |
| | 1262 | 1433 | 1359 | 1341 |
| | 1369 | 1254 | 1220 | 1340 |
| | 1423 | 1365 | 1385 | 1220 |
| | 1371 | 1369 | 1360 | 1369 |
| | 1322 | 1293 | 1399 | 1408 |
| | 1272 | 1320 | 1179 | 1388 |
| | 1240 | 1430 | 1336 | 1293 |
| | 1423 | 1229 | 1288 | 1343 |
| | 1389 | 1377 | 1248 | 1361 |
| | 1337 | 1349 | 1309 | 1299 |
| | 1357 | 1358 | 1377 | 1371 |
| | 1270 | 1421 | 1409 | 1420 |
| | 1341 | 1436 | 1458 | 1290 |
| Average (MPa) | 1352 | 1363 | 1337 | 1318 |

In constrast to manufacturing that employed stationary drying (see Table 3), manufacturing that employed the drying method of the present embodiment hardly yielded the ceramic heaters 1 having low strength, but consistently yielded the ceramic heaters 1 having high strength (specifically, not less than 1000 MPa in terms of 3-point flexural strength). A ceramic heater for use in a glow plug, which is exposed to severe environment, or the interior of a combustion chamber of an engine, must have a 3-point flexural strength not less than 1000 MPa. Therefore, when the slurry 10 uses water as solvent, a method as described herein according to the invention must be used for drying the slurry 10, in preparation of the heating-element material powder 24.

What is claimed is:

1. A method for manufacturing a ceramic heater comprising the steps of:

providing a conductive ceramic powder, an insulating ceramic powder, a powdered sintering aid and a water containing solvent;

mixing the conductive ceramic powder, the insulating ceramic powder, the sintering aid and solvent to thereby form a slurry;

drying the slurry to obtain a heating-element material powder;

forming a resistance-heating-element from the heating-element material powder;

providing a ceramic substrate;

embedding the resistance-heating element in the ceramic substrate to form a resultant assembly; and, wherein the conductive ceramic powder and insulating powder each has a 50% particle size of about 1 μm; and, firing the resultant assembly to thereby form a ceramic heater.

2. The method for manufacturing a ceramic heater according to claim 1, in which the solvent is predominately water and in which the slurry is dried in a fluidized-bed drying apparatus.

3. The method for manufacturing a ceramic heater according to claim 1, in which the solvent is predominately water and in which the slurry is dried in a rotary drying apparatus.

4. The method for manufacturing a ceramic heater according to claim 1, in which the solvent is predominately water and in which the slurry is dried in a vibratory drying apparatus.

5. The method for manufacturing a ceramic heater according to claim 1, in which the solvent is predominately water and which includes the use of a medium in the drying step.

6. The method for manufacturing a ceramic heater according to claim 1, in which the insulating ceramic powder comprises $Si_3N_4$ and the conductive ceramic powder comprises a material selected from the group consisting of TiN, MoSi $WSi_2$ and WC.

7. The method for manufacturing a ceramic heater according to claim 5, in which the medium comprises a medium for pulverization.

8. The method for manufacturing a ceramic heater according to claim 5 in which the medium comprises a plurality of objects selected from the group consisting of ceramics, resins and resin coated objects.

9. The method for manufacturing a ceramic heater in accordance with claim 5, in which the medium comprises a plurality of objects in the form of at least one of balls, cubes, tubes and plate like shapes.

10. A method for manufacturing a glow plug for a diesel engine, said method comprising the steps of:

providing a mass of a conductive ceramic powder, a mass of an insulating ceramic powder, a mass of a powdered sintering aid and a solvent which is predominately water;

forming a slurry by mixing the mass of conductive ceramic powder, the mass of an insulating ceramic powder, the mass of a powdered sintering aid and the solvent;

drying the slurry to obtain a heating element material powder by passing a hot gas though the slurry while maintaining the powder in a fluidized state;

forming a green resistance-heating element from the heating element material powder;

providing a ceramic substrate;

embedding the resistance-heating element in the ceramic substrate to form a resultant assembly;

wherein the conductive ceramic powder and insulating powder each has a 50% particle size of about 1 μm; and firing the resultant assembly to thereby form a glow plug for a diesel engine.

11. A method for manufacturing a glow plug for a diesel engine according to claim 10, in which the conductive ceramic powder, insulating ceramic powder and powdered sintering aid are individually purified and pulverized.

12. A method for manufacturing a glow plug for a diesel engine according to claim 11, in which the drying of the slurry includes the use of a hot gas at a temperature of between about 100 C to about 200 C.

13. The method for manufacturing a glow plug for a diesel engine according to claim 10, which includes the step of dispersing the slurry on the surfaces of a medium.

14. A method for manufacturing a glow plug for a diesel engine according to claim 13, which includes the step of exfoliating dried powder from the surface of the medium.

15. A method for manufacturing a glow plug for a diesel engine according to claim 10, in which the conductive ceramic powder and insulating powder and sintering aid powder are dispersed in an ion-exchange treated water.

16. A method for manufacturing a glow plug for a diesel engine, said method comprising the steps of:

providing a mass of a conductive ceramic powder, a mass of an insulating ceramic powder, a mass of a powdered sintering aid and a solvent which is predominately water;

forming a slurry by mixing the mass of conductive ceramic powder, the mass of an insulating ceramic powder, the mass of a powdered sintering aid and the solvent;

drying the slurry to obtain a heating element material powder by passing a hot gas through the slurry while maintaining the powder in a fluidized state;

forming a green resistance-heating element from the heating element material powder;

providing a ceramic substrate embedding the resistance-heating element in the ceramic substrate to form a resultant assembly;

wherein the sintering aid powder has a 50% particle size of about 5 μm, and firing the resultant assembly to thereby form a glow plug for a diesel engine.

* * * * *